United States Patent [19]

Davis, Jr. et al.

[11] Patent Number: 4,950,970

[45] Date of Patent: Aug. 21, 1990

[54] INDUCTION MOTOR CONTROL SYSTEM

[75] Inventors: Ray E. Davis, Jr., Old Lyme; Michael J. Westkamper, Oakdale; Earle J. Timothy, Clinton; Richard H. Johnson, Ivoryton; Ronald W. Parker, Clinton, all of Conn.

[73] Assignee: Chesebrough-Pond's Inc., Greenwich, Conn.

[21] Appl. No.: 840,476

[22] Filed: Mar. 14, 1986

Related U.S. Application Data

[63] Continuation of Ser. No. 548,701, Nov. 4, 1983.

[51] Int. Cl.$^5$ .............................................. H02P 5/40
[52] U.S. Cl. ..................................... 318/809; 318/729
[58] Field of Search ................................ 318/729, 809

[56] References Cited

U.S. PATENT DOCUMENTS

| 3,441,823 | 4/1969 | Schlabach | 318/809 |
| 3,723,840 | 3/1973 | Opal et al. | 318/432 |
| 4,130,863 | 12/1978 | Schweitzer et al. | 364/158 |
| 4,276,505 | 6/1981 | Bose | 318/723 |
| 4,355,274 | 10/1982 | Bourbeau | 318/729 |
| 4,408,149 | 10/1983 | Collins et al. | 318/729 |
| 4,477,761 | 10/1984 | Wolfe | 318/800 |

OTHER PUBLICATIONS

Toth A., "Energy Savings in an Induction Motor Using the 8022 Microcontroller", AP-94, Intel Corp.

Primary Examiner—David Smith, Jr.

[57] ABSTRACT

An improved induction motor control system. Single-phase and three-phase AC induction motors are controlled in accordance with the equation $y = mx + b$, where y is the phase angle, m is the slop, x is the firing delay and b is the offset. Subsequently, the firing delay is increased by predetermined amounts, the behavior of the phase angle is evaluated for several cycles, and the motor is controlled based on the results of the evaluation, thereby minimizing energy consumption.

22 Claims, 10 Drawing Sheets

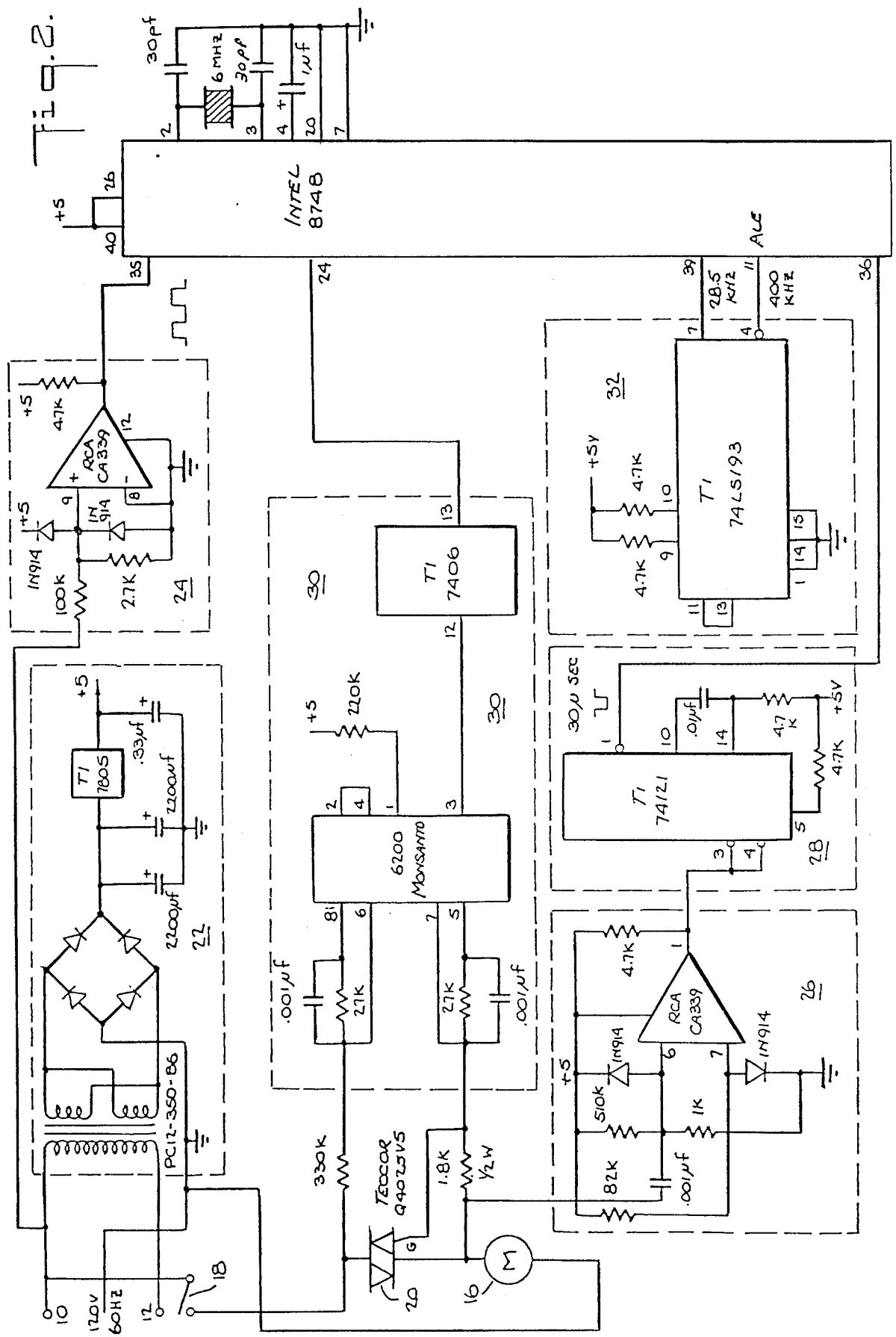

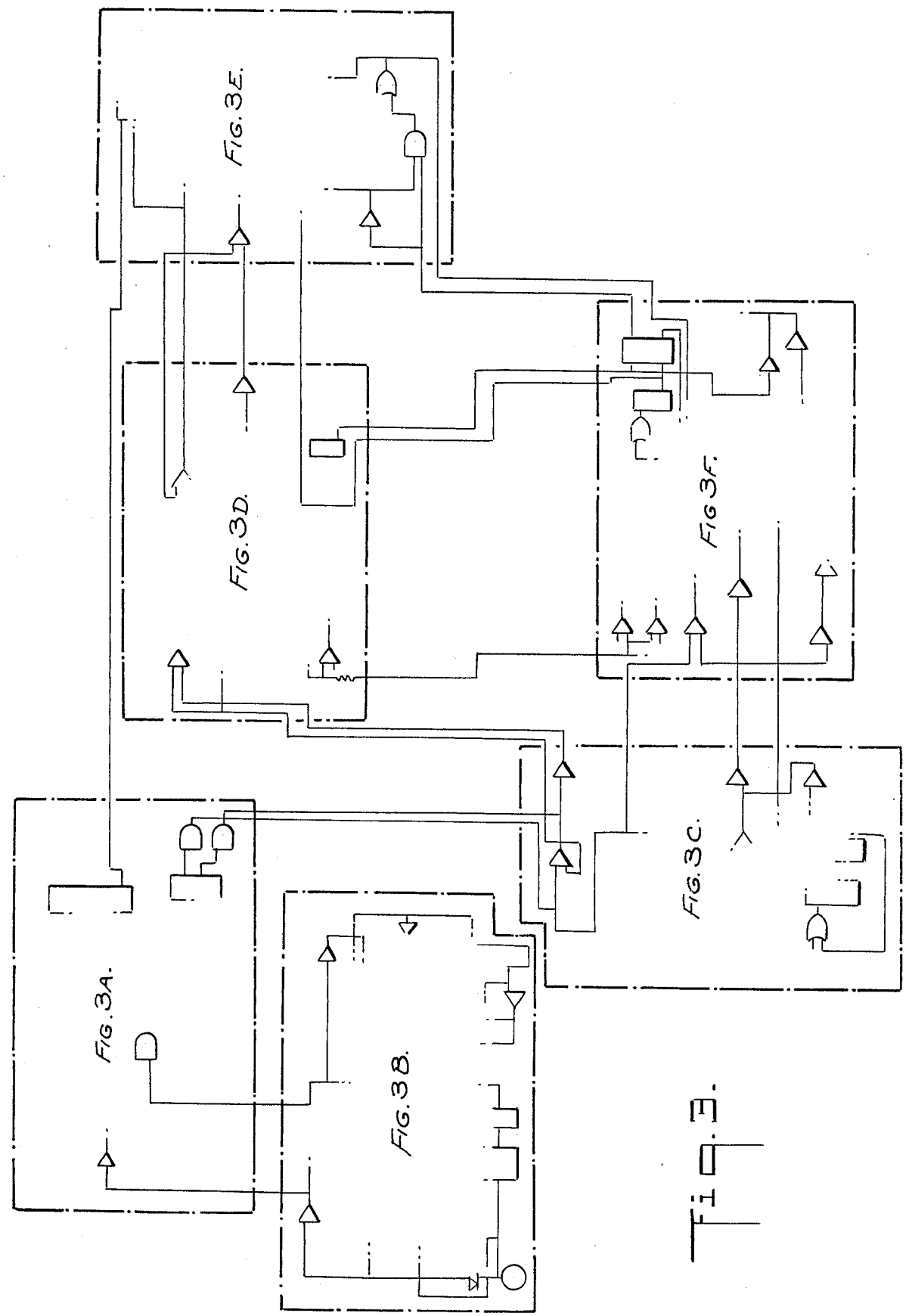

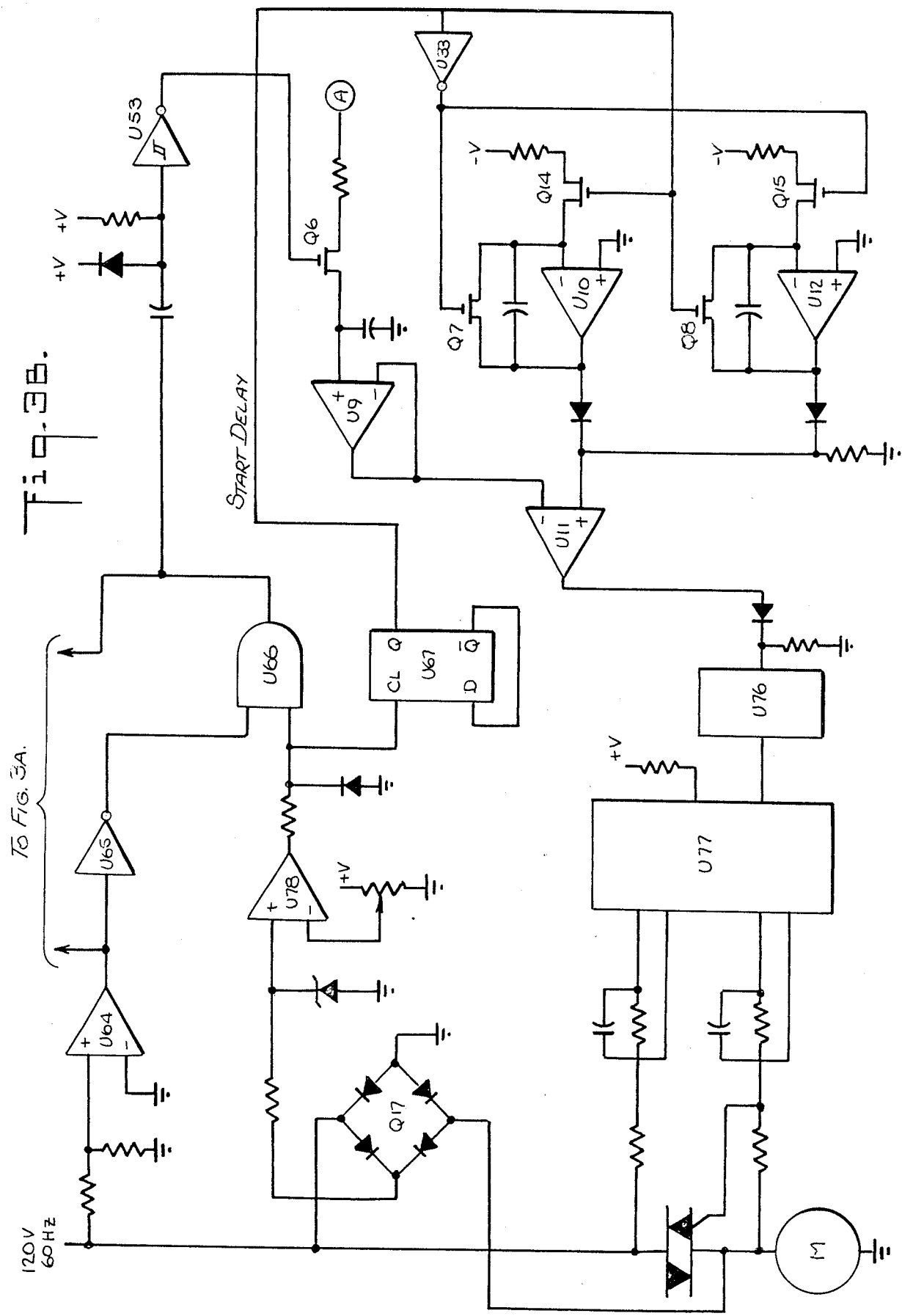

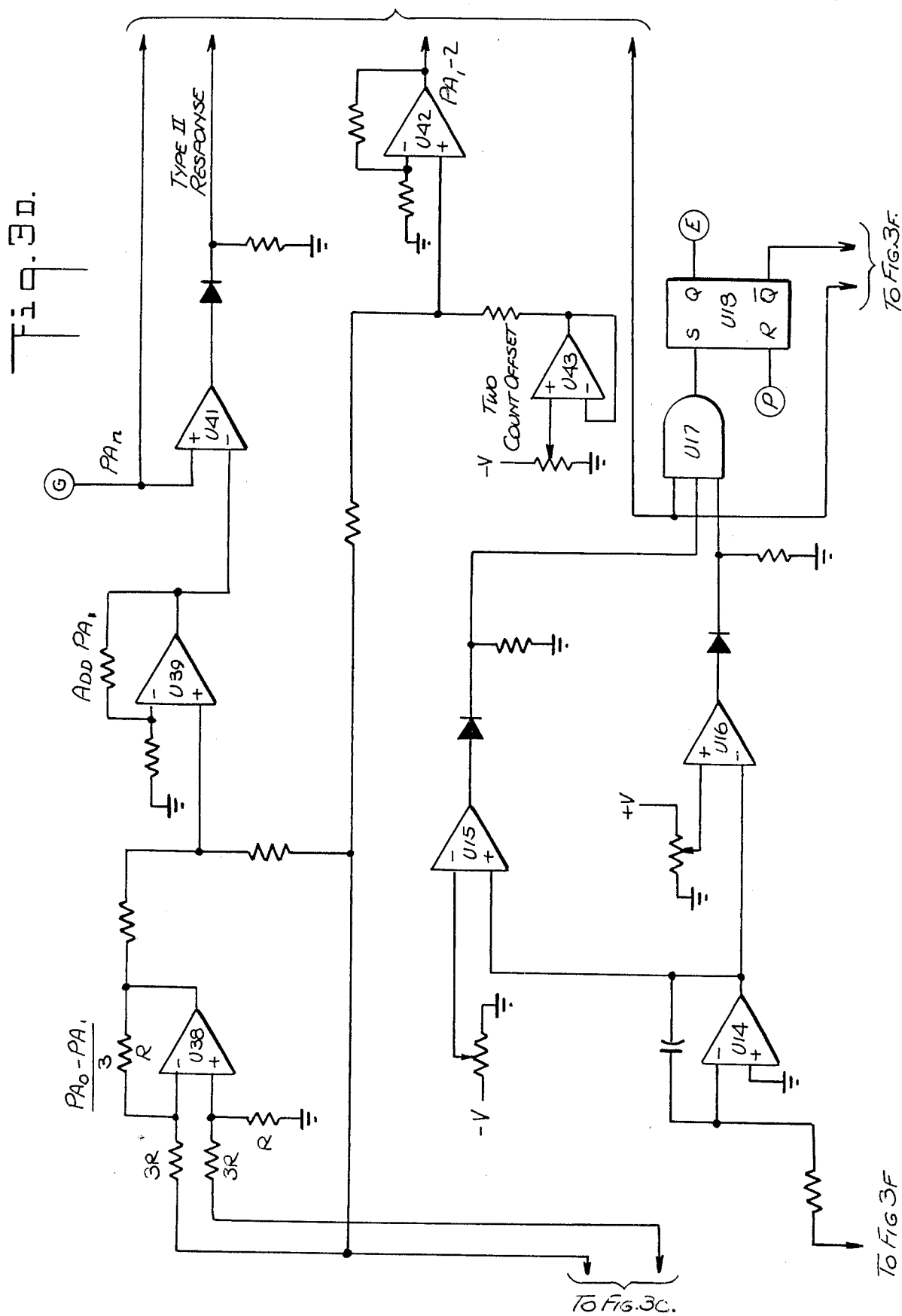

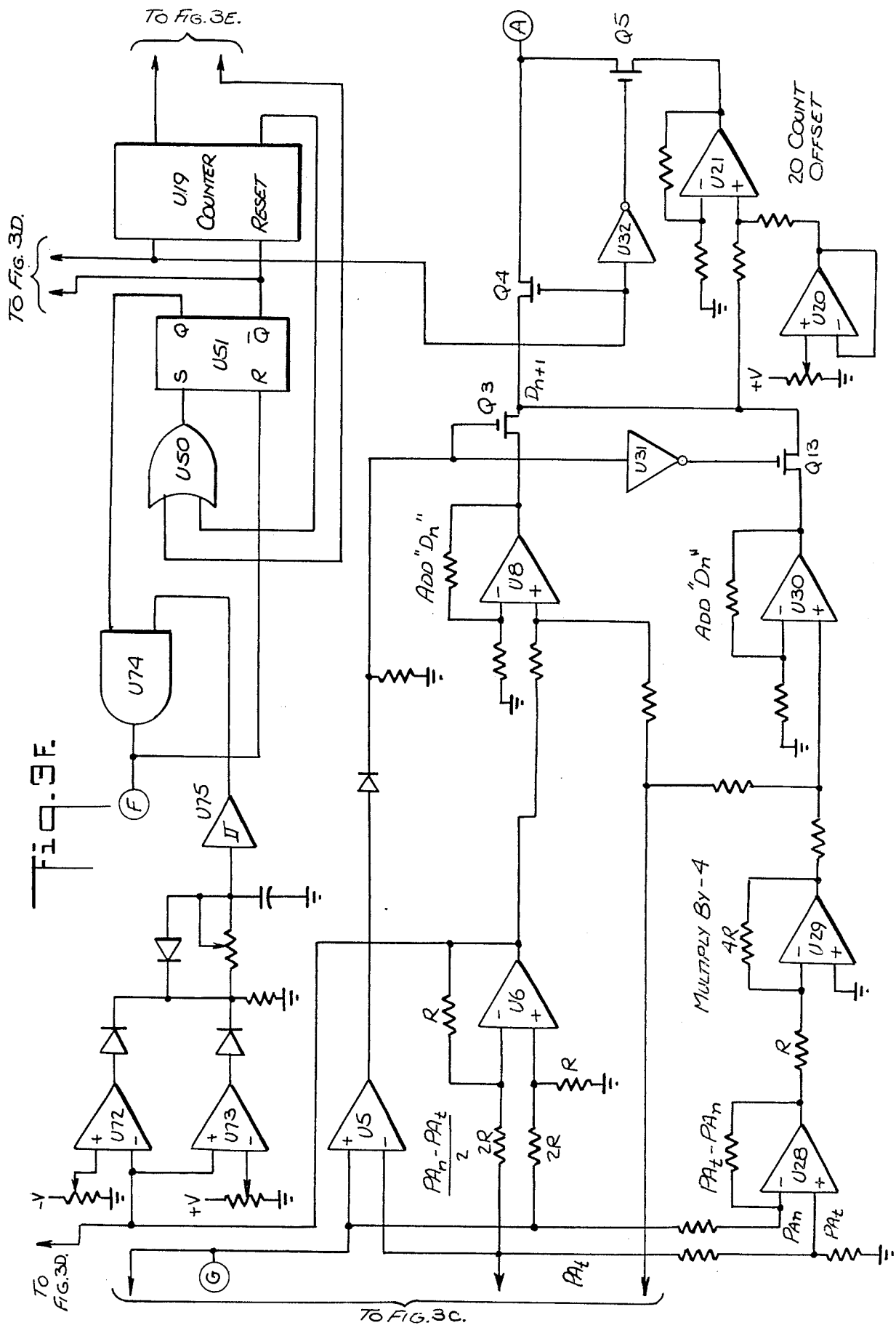

INDUCTION MOTOR CONTROL SYSTEM

This is a continuation of co-pending application Ser. No. 548,701, filed on Nov. 4, 1983.

BACKGROUND OF THE INVENTION

The present invention relates to an improved control system for AC induction motors and, in its preferred embodiment, to an improved digital induction motor control system.

A prior art digital induction motor control system is shown in U.S. Pat. No. 4,361,792 issued Nov. 30, 1982 and assigned to the assignee of the instant application. The system disclosed in that prior art patent derives a calibrated phase angle and then controls the operation of the motor based on that phase angle, irrespective of variations in motor loading. In this way energy consumption is reduced. Referring to FIG. 1 of U.S. Pat. No. 4,361,792, after the motor has gotten up to speed the count in incremental counter 38 and delay counter 36 is zero. The number in phase angle counter 34 corresponds to the phase angle between motor voltage and motor current zero crossings. The count in the incremental counter is incremented every other cycle, which causes the count in the delay counter to be similarly increased. This increased delay in firing the triac reduces the phase angle and, therefore, the count in the phase angle counter. Eventually, the number in the phase angle counter will be approximately equal to the number in the delay counter. The number in the phase angle counter can then be stored in the phase angle register as the calibrated phase angle and used to operate the system.

Deriving the calibrated phase angle in this manner, however, means that the number stored in the phase angle register as the calibrated phase angle depends, in part, on the initial motor loading. Greater power savings can be obtained if the motor happens to be heavily loaded when the calibrated phase angle was derived. The prior art also discloses how to modify the initial calibrated phase angle so as to yield a refined calibrated phase angle. See column 5, line 3 through column 6, line 3 of U.S. Pat. No. 4,361,792.

BRIEF DESCRIPTION OF THE PRESENT INVENTION

The Present invention represents an improvement over the invention of U.S. Pat. No. 4,361,792. As noted in that patent, application was based on limited experimentation. Based on extensive experimental work applicants have developed a new and improved method for controlling AC induction motors. Applicants have discovered that changes in both the phase angle and the firing delay result from changes in motor load and that these changes occur in a characteristic manner which is common to AC induction motors. This characteristic may be approximated by an equation of the form $y=mx+b$, where y is the phase angle, x is the firing delay, m is the slope and b is the offset. Applicants have also discovered how this characteristic may be used to control AC induction motors with substantial energy savings.

In addition, applicants have discovered a way to optimize energy savings by means of a "perturbation" technique in which the firing delay is increased by a predetermined amount and the behavior of the phase angle is evaluated for several cycles. If the result of the evaluation indicates that additional energy savings are possible, the firing delay is again increased by a predetermined amount and the behavior of the phase angle is again monitored for several cycles. This process is repeated until energy savings are maximized.

BRIEF DESCRIPTION OF THE DRAWING

FIG. 2 is a schematic diagram of a preferred motor control system which may be used to implement the present invention.

DETAILED DESCRIPTION OF THE PREFERRED EMBODIMENT

As already noted, the present invention is based on applicants' discovery that AC induction motors share a common characteristic, namely, that changes in phase angle and firing delay with variations in motor load can be approximated by the formula $y=mx+b$, where y is the phase angle, m is the slope, x is the firing delay and b is the offset. A preferred equation which has been found applicable to all single-phase AC induction motors tested is $PA = -0.12\ DLY + 70$. Implementation of this equation permits control of the motor with substantial energy savings. In the equation, PA and DLY are expressed in units of count. In the illustrative embodiment of the invention shown herein, 1 count is equal to 30 microseconds or 0.648 electrical degrees at 60 Hertz.

Figure 1A:
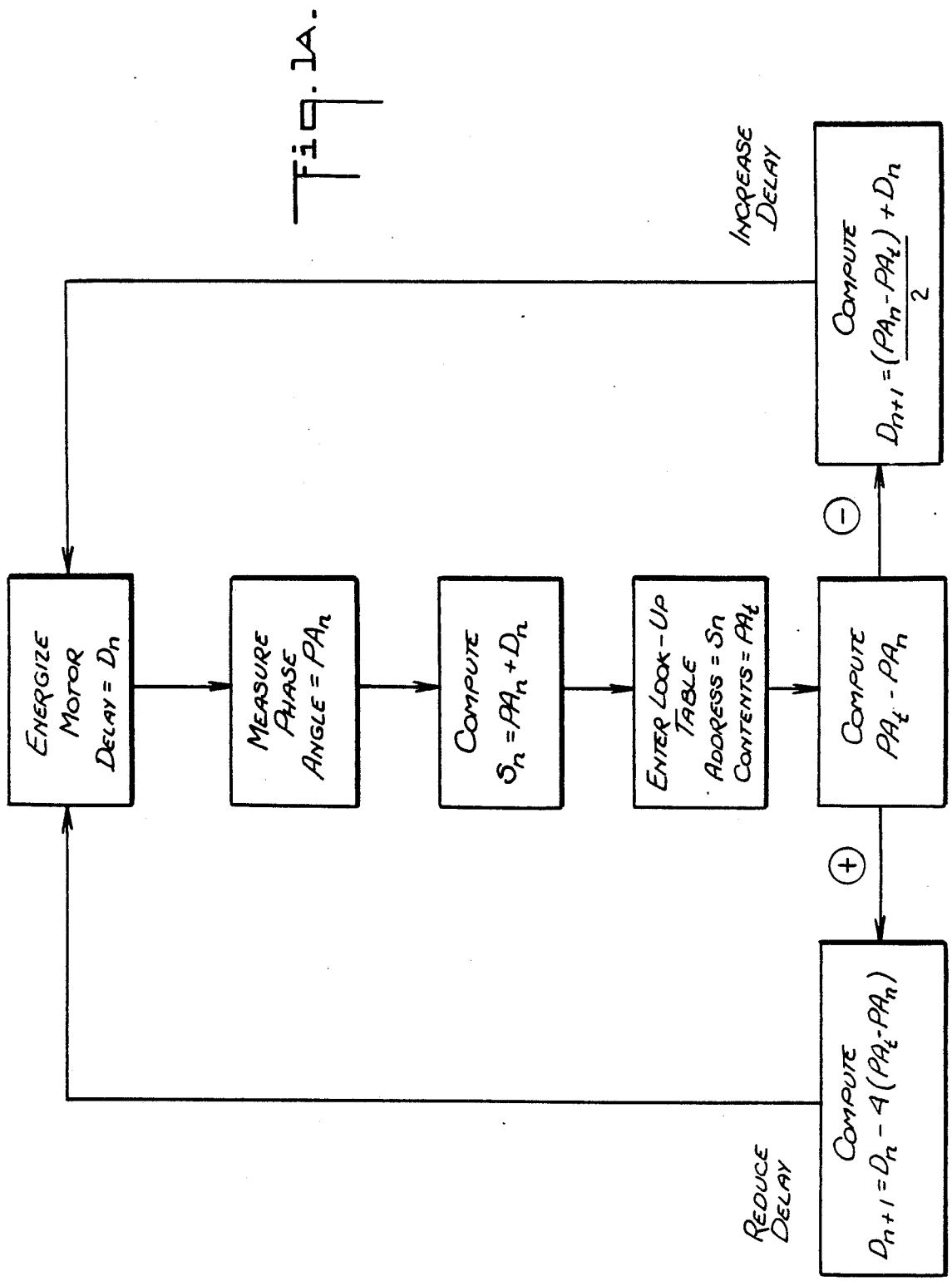
FIG. 1A is a flow diagram depicting the operation of a motor control system in accordance with the present invention.

FIG. 1A discloses generally how the motor is controlled in accordance with the equation $PA = -0.12\ DLY + 70$. At event N, the motor is energized using a firing delay $D_n$. The phase angle $PA_n$ is then measured. The sum of $S_n$ of the delay $D_n$ and the phase angle $PA_n$ is then used as the address for a computergenerated look-up table. The contents of that address $PA_t$ (phase angle table) is compared with the previous phase angle $PA_n$ and the result used either to increase or decrease the delay. Initially, $PA_n$ will be greater than $PA_t$ and the delay will be increased in accordance with the formula $D_{n+1} = (PA_n - PA_t)/2 + D_n$. This increased delay in energizing the motor results in energy savings. The process is repeated until $PA_t$ and $PA_n$ are approximately equal. If the motor load increases, $PA_t$ will exceed $PA_n$. Now the delay will be reduced in accordance with the formula $D_{n+1} = D_n - 4(PA_t - PA_n)$. This reduced delay in energizing the motor results in more power being delivered to the motor to handle the increased load and ensures that the motor continues to operate at its designed, constant speed.

Table I, set forth on the next page, is a computer generated look-up table based on the equation $PA = -0.12\ DLY + 70$. The sum of the phase angle PA and the delay DLY is used as the table entry point for initial motor control. The entries in the table are phase angles, i.e., $PA_t$. Thus, if the sum of PA and DLY is 100 (100 +0), the phase angle from the table is 65. If $PA + DLY = 106$ (100 +6), $PA_t = 64$. Similarly, if $PA + DLY = 193$, $PA_t = 53$; whereas if $PA + DLY = 194$, $PA_t = 52$. The table provides for 256 sum entry points and these 256 entry points are divided into 16 groups or levels, with 16 entry points in each level. Thus, sum 0 through 15 form Level 1, sums 16 through 32 form Level 2, etc. It should be noted that small entry sums indicate high motor loads whereas large sums indicate low motor loads. It should also be noted that the firing delay is never less than 1. Thus, in Levels 1 through 4 the 100 indicates that a firing delay of 1 is to be maintained.

TABLE 1

| LEVEL | Sum | \(PA = -.12 DLY + 70\) | | | | | | | | | |
|---|---|---|---|---|---|---|---|---|---|---|---|
| | | +0 | +1 | +2 | +3 | +4 | +5 | +6 | +7 | +8 | +9 |
| 1 | 0 | 100 | 100 | 100 | 100 | 100 | 100 | 100 | 100 | 100 | 100 |
|   | 10 | 100 | 100 | 100 | 100 | 100 | 100 |   |   |   |   |
| 2 | 10 |   |   |   |   |   |   | 100 | 100 | 100 | 100 |
|   | 20 | 100 | 100 | 100 | 100 | 100 | 100 | 100 | 100 | 100 | 100 |
|   | 30 | 100 | 100 |   |   |   |   |   |   |   |   |
| 3 | 30 |   |   | 100 | 100 | 100 | 100 | 100 | 100 | 100 | 100 |
|   | 40 | 100 | 100 | 100 | 100 | 100 | 100 | 100 | 100 |   |   |
| 4 | 40 |   |   |   |   |   |   |   |   | 100 | 100 |
|   | 50 | 100 | 100 | 100 | 100 | 100 | 100 | 100 | 100 | 100 | 100 |
|   | 60 | 100 | 100 | 100 | 100 |   |   |   |   |   |   |
| 5 | 60 |   |   |   |   | 100 | 100 | 100 | 100 | 100 | 100 |
|   | 70 | 69 | 69 | 69 | 69 | 69 | 69 | 69 | 68 | 68 | 68 |
| 6 | 80 | 68 | 68 | 68 | 68 | 67 | 67 | 67 | 67 | 67 | 67 |
|   | 90 | 67 | 67 | 66 | 66 | 66 | 66 |   |   |   |   |
| 7 | 90 |   |   |   |   |   |   | 66 | 66 | 66 | 65 |
|   | 100 | 65 | 65 | 65 | 65 | 65 | 65 | 64 | 64 | 64 | 64 |
|   | 110 | 64 | 64 |   |   |   |   |   |   |   |   |
| 8 | 110 |   |   | 64 | 64 | 63 | 63 | 63 | 63 | 63 | 63 |
|   | 120 | 63 | 62 | 62 | 62 | 62 | 62 | 62 | 62 |   |   |
| 9 | 120 |   |   |   |   |   |   |   |   | 61 | 61 |
|   | 130 | 61 | 61 | 61 | 61 | 61 | 61 | 60 | 60 | 60 | 60 |
|   | 140 | 60 | 60 | 60 | 59 |   |   |   |   |   |   |
| 10 | 140 |   |   |   |   | 59 | 59 | 59 | 59 | 59 | 59 |
|   | 150 | 58 | 58 | 58 | 58 | 58 | 58 | 58 | 58 | 57 | 57 |
| 11 | 160 | 57 | 57 | 57 | 57 | 57 | 56 | 56 | 56 | 56 | 56 |
|   | 170 | 56 | 56 | 55 | 55 | 55 | 55 |   |   |   |   |
| 12 | 170 |   |   |   |   |   |   | 55 | 55 | 55 | 55 |
|   | 180 | 54 | 54 | 54 | 54 | 54 | 54 | 54 | 53 | 53 | 53 |
|   | 190 | 53 | 53 |   |   |   |   |   |   |   |   |
| 13 | 190 |   |   | 53 | 53 | 52 | 52 | 52 | 52 | 52 | 52 |
|   | 200 | 52 | 52 | 51 | 51 | 51 | 51 | 51 | 51 |   |   |
| 14 | 200 |   |   |   |   |   |   |   |   | 51 | 50 |
|   | 210 | 50 | 50 | 50 | 50 | 50 | 50 | 49 | 49 | 49 | 49 |
|   | 220 | 49 | 49 | 49 | 49 |   |   |   |   |   |   |
| 15 | 220 |   |   |   |   | 48 | 48 | 48 | 48 | 48 | 48 |
|   | 230 | 48 | 48 | 48 | 48 | 48 | 48 | 48 | 48 | 48 | 48 |
| 16 | 240 | 48 | 48 | 48 | 48 | 48 | 48 | 48 | 48 | 48 | 48 |
|   | 250 | 48 | 48 | 48 | 48 | 48 | 0 |   |   |   |   |

It will be appreciated that a different table can be generated by varying the slope from $-0.12$ to some other value such as $-0.18$ or by varying the offset from 70 to some other value such as 68. A different table could also be generated by varying both the slope and the offset For example, applicants have controlled single-phase AC induction motors based on a table generated in accordance with the formula $PA = -0.18\ DLY + 72$. The slope may vary between about $-0.2$ and about $-0.1$, while the offset may vary between about 65 and about 72. Applicants will now show, by means of a specific example, how the motor is controlled using this type of equation.

Initially, the computer determines the existing phase angle PA, adds the start-up firing delay of 1 to PA, and uses this sum to enter the table. The computer then reads the phase angle in the table, which corresponds to this table entry sum and calculates a new firing delay. If $PA_1 = 99$, then $PA_1 + DLY_1 = 99 + 1 = 100$. Referring to Table 1, address 100 contains a $PA_t$ of 65. Since $PA_1$ is greater than $PA_t$, the new firing delay is calculated as follows: new delay $= (PA_1 - PA_t)/2$ + old delay $= (99 - 65)/2 + 1 = 18$. The new firing delay of 18 is now implemented and the resulting phase angle is measured, in this case 95. The new entry sum is $95 + 18 = 113$, which gives a $PA_t$ of 64. The new delay is $(95-64)/2+18=33$. This process continues and eventually, assuming that the motor load does not change, a point in the table will be reached where the sum remains fairly constant, i.e., $PA_t$ approximately equals $PA_n$. If, however, $PA_t$ exceeds $PA_n$, this indicates an increase in motor loading. The firing delay is then reduced by the amount $4(PA_t - PA_n)$. See FIG. 1A.

The foregoing motor control technique provides a smooth response to clutched loads without risk of motor stall and without having to respond with full power, which is an inefficient response unless absolutely necessary. The motor automatically responds to load changes, in either direction, finding its proper position in the table for increased energy efficiency. While this basic approach has been proven effective in increasing the energy efficiency of all motors tested, many motors possess the potential for even greater energy savings. This is due to the fact that such motors deviate from the empirical formula $PA = -0.12\ DLY + 70$: (1) having a slope other than $-0.12$ (2) having an offset other than 70: (3) having the phase angle and/or delay vary non-linearly with load; or (4) a combination of the foregoing. In order to optimize the energy efficiency of all motors, a further motor control technique has been developed. This involves "perturbing" the motor operation by introducing an additional predetermined delay in energizing the motor, observing the behavior of the phase angle for several cycles in response to the delay, and then controlling the motor based on the nature of the phase angle response.

After initial control of the motor has been accomplished in accordance with FIG. 1A and Table 1, an additional firing delay of 20 counts is added to the existing delay. The effect of this additional delay on the phase angle is then determined. This is accomplished by measuring and storing the value of PA at $T_o$ (when the 20 count firing delay is added) and at $T_1$, $T_2$, $T_3$, $T_4$ and $T_5$ (the next 5 positive-going zero crossings of motor current). $PA_o$ is the phase angle at $T_o$, $PA_1$ the phase angle at $T_1$, etc.

Figure 1B:
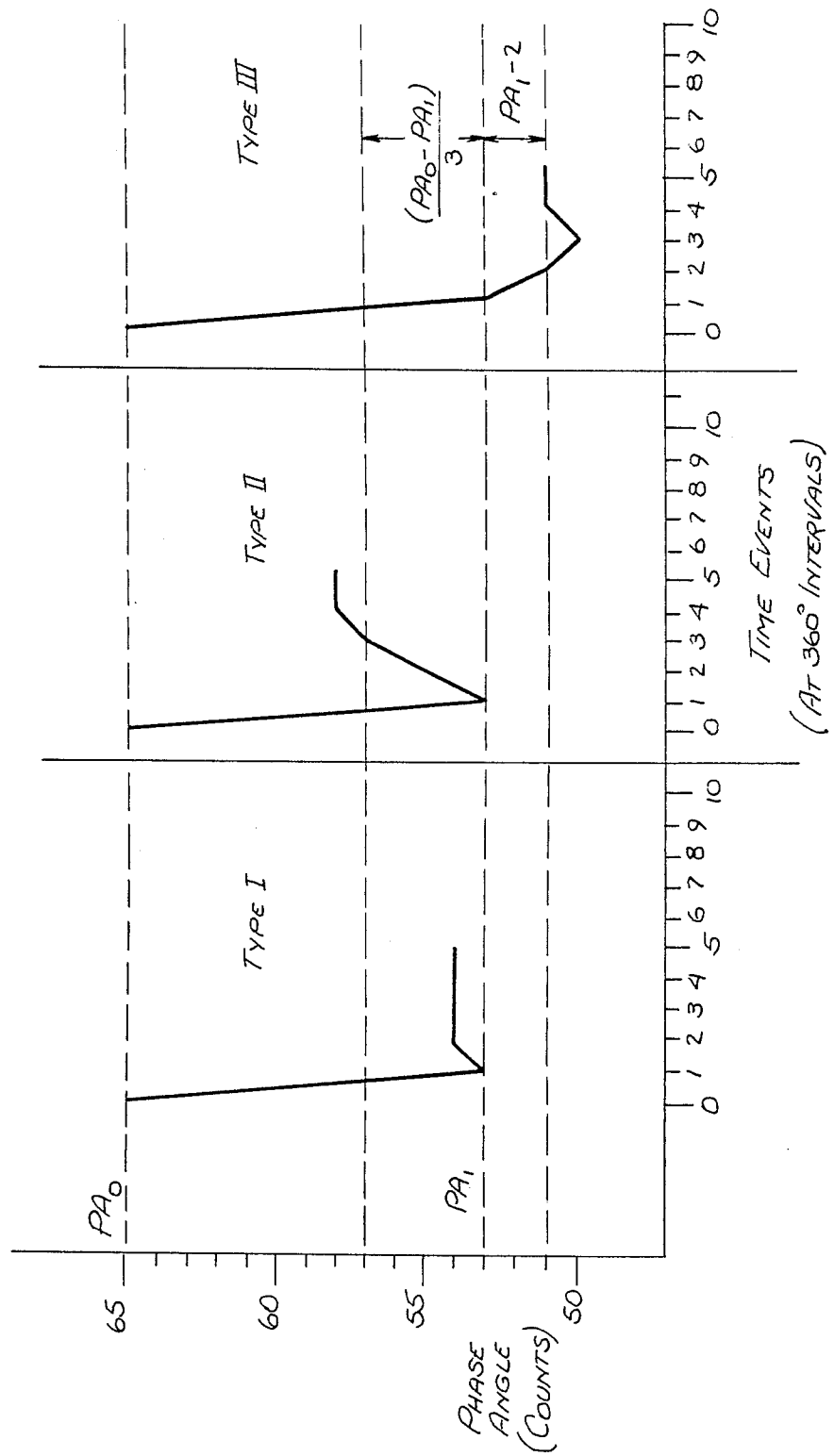
FIG. 1B comprises graphs of typical motor responses when controlled in accordance with the present invention.

As shown in FIG. 1B, there are three basic types of responses to increasing the firing delay by a predetermined amount. In a Type I response, the phase angle is reduced from $PA_o$ to $PA_1$ and then remains between $PA_1$ and $(PA_o-PA_1)/3$, i.e., it recovers to less than ⅓ of the difference between $PA_o$ and $PA_1$. In a Type II response, the phase angle is reduced from $PA_o$ to $PA_1$ and then recovers to more than ⅓ of the difference between $PA_o$ and $PA_1$. In a Type III response, the Phase angle is initially reduced from $PA_o$ to $PA_1$ and then further decreases to a level of $PA_{1-2}$. In the event of a Type III response, the calibration procedure is aborted and the computer controls the motor based on the conditions in effect at time $T_o$. In the event of a Type II response, the computer temporarily classifies the delay at $T_o$ (the delay in effect before introducing the additional 20 count delay) as the optimum delay for maximum energy savings at that load and at those operating conditions (e.g., temperature, supply voltage, etc.). The computer will, however, repeat the process several times to verify that a Type II response continues to be obtained. A Type I response indicates that it may be possible to obtain additional energy savings. In that event the computer increments the firing delay and evaluates the response of the phase angle until a Type II or Type III response is obtained, i.e., until operating energy efficiency has been maximized.

Referring again to Table 1, the calibration process for optimizing energy efficiency is generally conducted at Levels 6–13. For convenience Table 1, which has an offset of 70, is referred to as a "70 Table." Experimentation to date has shown that all single-phase AC induction motors tested will operate satisfactorily, at all loads, using the 70 Table. Motors that produce a Type I response, which indicates that additional energy savings may be possible, are assigned smaller phase angles corresponding to their look-up table entry sums. This is done, each time there is a Type I response, by decrementing the offset. In other words, when a Type I response is obtained the equation is changed from $PA = -0.12\ DLY + 70$ to $PA = 0.12\ DLY + 69$.

For example, assuming that the motor is operating at a look-up table entry sum of 140, this corresponds to a $PA_t$ of 60. If a Type I response is obtained, a new calculation is made based on the equation $PA = -0.12\ DLY + 69$. This yields a $PA_t$ of 59 for a look-up table entry sum of 140. If another Type I response is obtained, a new calculation is made based on the equation $PA = -0.12\ DLY + 68$. This yields a $PA_t$ of 58 for a look-up table entry sum of 140. The effect of this procedure, for a constant look-up table entry sum, is to increase the firing delay and reduce the power delivered to the motor, thereby increasing energy savings. This procedure is repeated until a Type II response is obtained, indicating that energy savings have been maximized. In the illustrative embodiment of the invention disclosed herein, the minimum allowable offset (maximum energy savings point) has been limited to 60. A Type III response indicates either that the motor load is increasing or that maximum energy savings have been obtained. In either case, further calibration is halted until stable operation resumes.

Referring to Table I, the calibration process for maximizing operating energy efficiency is limited to Levels 6–3. It is possible that some motors, in certain applications, will operate at one constant load point, thus limiting calibration to a look-up table entry sum corresponding to that load point. Even with a constant load, however, fluctuations in supply voltage, operating temperature, motor friction, etc. will cause the table entry sums to vary somewhat, thus creating the likelihood a motor varying from one level to another. When this occurs experimentation has shown that when the offsets between adjacent levels differ by more than 5, and the motor is oscillating between such levels, a discernable "bump" is produced which could be disconcerting to the user. Accordingly, applicants have devised the following technique for adjusting the offsets of adjacent levels so that they never differ by more than 3.

Returning to the preceding example, the table entry sum was 140. This corresponds to Level 9 in Table 1. When the calibration procedure is commenced and a Type I response is obtained, the computer changes the offset for Level 9 to 69. None of the other levels is affected. If another Type I response is now obtained, the Level 9 offset is dropped to 68. This continues until one half the difference between the offsets of adjacent levels is equal to or exceeds 3. When that occurs, one half the difference is applied to the adjacent level, differences being rounded up. In the foregoing example, the first adjustment of adjacent levels occurs when the offset for Level 9 reaches 65. Then $70-65/2=2.5$, which is rounded up to 3. At this point, Levels 8 and 10 are assigned offsets of 67. When the offset for Level 9 reaches 62, the offsets for Levels 8 and 10 are adjusted to 64. Since Levels 7 and 11 now differ from Levels 8 and 10 by more than the permitted amount, the offsets for Levels 7 and 11 are adjusted to 67. The offset for Level 9 can now go down to 60 (the lowest permitted in this illustrative embodiment of the invention), without necessitating any further adjustments of the offsets of the adjacent levels.

If the motor continues to operate at Level 9, no other calibration attempt will occur. If, however, the motor load changes, causing entry to another level, the computer will compare the new offset with 60 (the previous offset) and will permit a sufficient number of calibration steps to occur so that an offset of 60 could be reached. For example, if the motor shifts to Level 7, which has an offset of 67, the computer will permit 7 calibration attempts to be executed. Levels 1 through 4 never deviate from a maximum firing delay of 1 while Levels 5, 14, 15 and 16 are never calibrated. They are, however, allowed to have their offsets adjusted based on the calibration of an adjacent level.

FIG. 2 discloses one motor control system which may be used to implement the present invention. FIG. 2 of the instant application is the same as FIG. 2 of U.S. Pat. No. 4,361,792 and the description of FIG. 2 is incorporated herein by reference. The present invention has been employed to control single-phase AC induction motors using the system shown in FIG. 2. A suitable computer program for practicing the present invention with the system shown in FIG. 2 is included at the end of the instant specification.

While the present invention has been described in terms of its application to single-phase AC induction motors, it may also be applied to 3-phase induction motors. For a description of a 3-phase digital motor control system see Column 6, lines 25-38 of U.S. Pat. No. 4,361,792, which is incorporated herein by reference. Based on more limited experimentation applicants have discovered that 3-phase AC induction motors also experience changes in phase angle and firing delay as a function of changes in motor load which vary in a characteristic manner and may be approximated by the expression $y = mx + b$. Again y is the phase angle, m is the slope, x is the firing delay and b is the offset. Unlike the case of single-phase AC induction motors, with a 3phase AC induction motor m is positive. A preferred equation for controlling 3-phase AC induction motors is $PA = +0.62\ DLY + 24$. With 3-phase AC induction motors the slope may vary from 0.5 to 0.7, while the offset may vary from 10 to 30.

It will be appreciated by those skilled in the art that the present invention is not limited to the specific illustrative embodiment disclosed herein. Thus, while applicants have disclosed that for single-phase AC induction motors value for m can be selected between $-0.1$ and $-0.2$ and values for b can be selected between 65 and 72, values can also be selected outside these ranges and still successfully control many motors. Similarly, while applicants have disclosed that for 3-phase AC induction motors values for m can be selected between 0.5 and 0.7 and values for b can be selected between 10 and 30, values can also be selected outside these ranges and still successfully control many motors. Other modifications and improvements within the scope of the present invention will also be apparent to persons skilled in the art. For example, the present invention may be implemented without using a programmed digital computer.

Figure 3A:
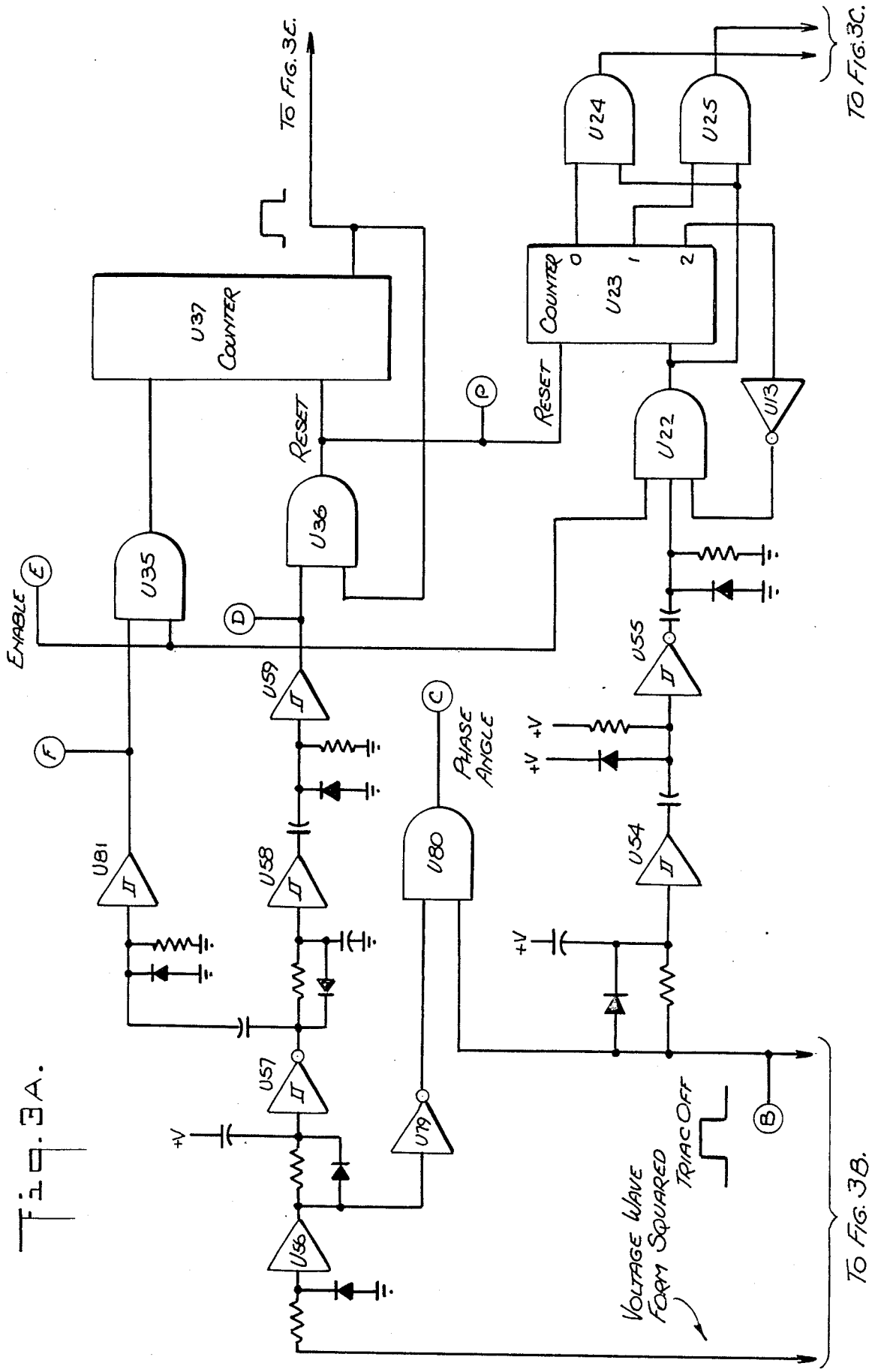
FIG. 3 is a schematic diagram of another motor control system which may be used to implement the present invention.
Figure 3C:
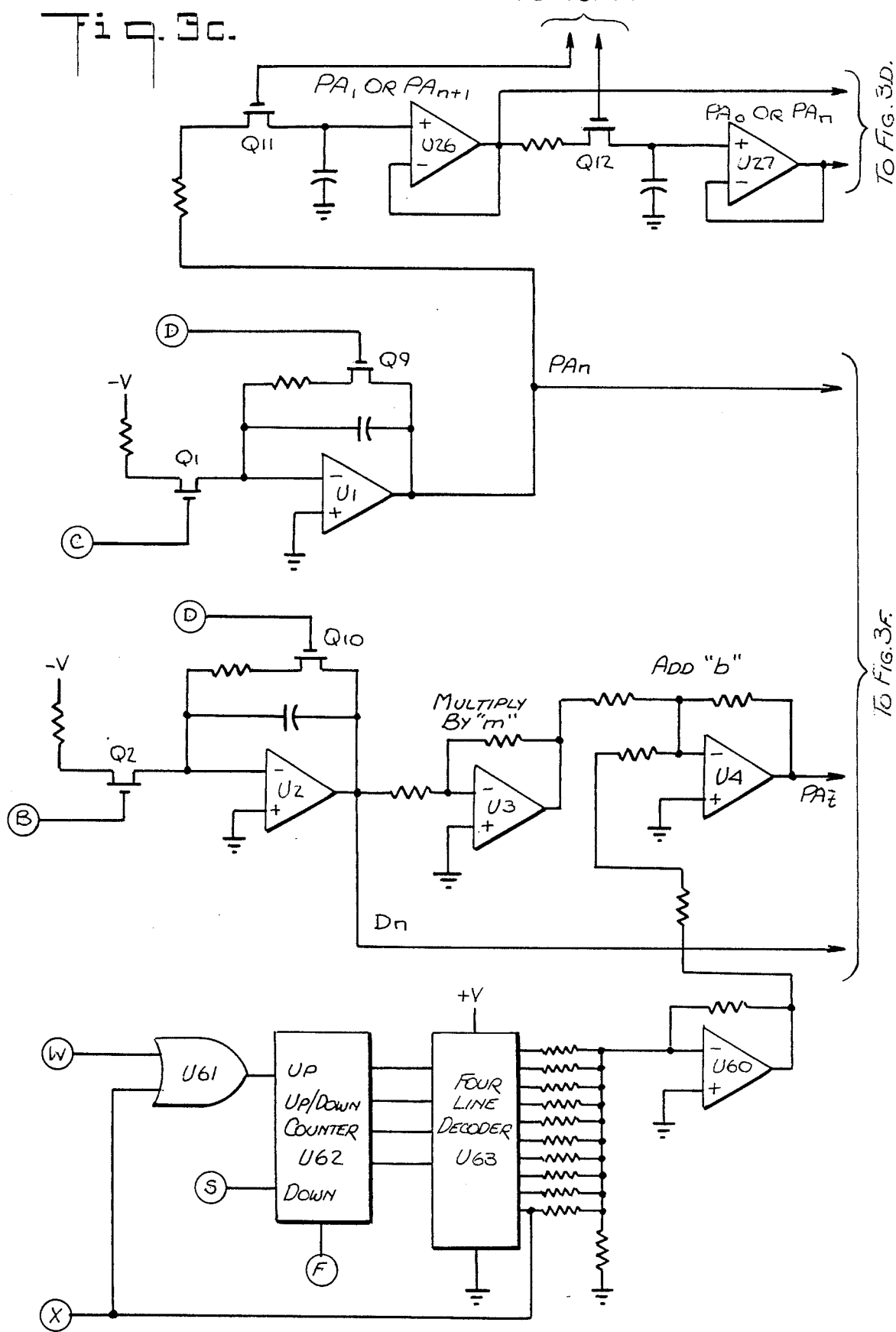
Figure 3E:
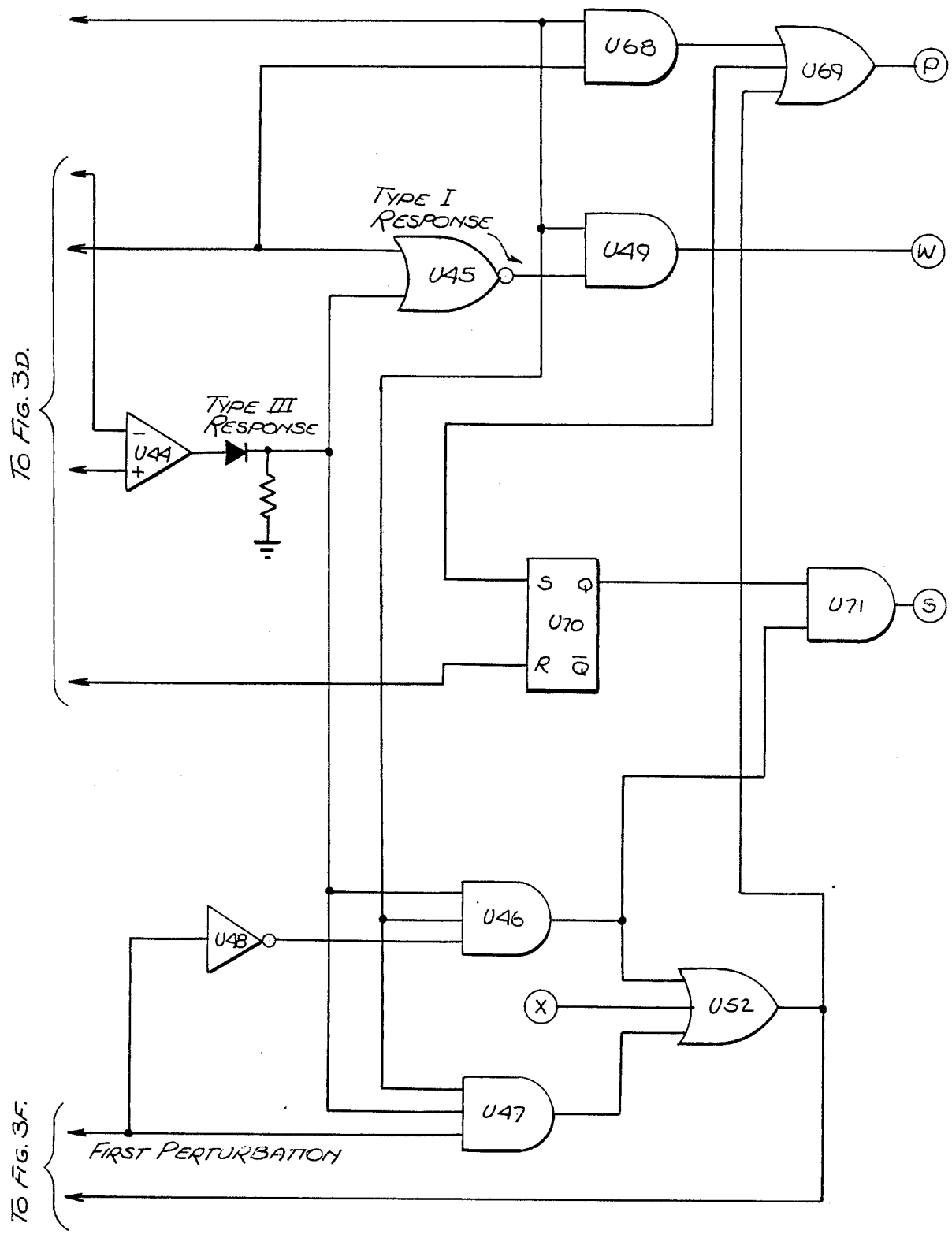

FIG. 3 of the present application discloses such a motor control system. In FIG. 3 Q1 through Q15 are FET transistors which conduct when a positive voltage is applied to their gates, while Q16 is a triac such as a Teccor Q4025V5 and Q17 is a diode bridge. The components designated U1-U6, U8-U12, U14-U16, U20, U21, U26, U27, U28-U30, U38-U39, U41-U44, U60, U64, U7Z, U73 and U78 are operational amplifiers. U13, U31-U33, U48, U53, U65 and U79 are inverters, while U56 is a non-inverting amplifier U17, UZ2, UZ4, U25, U35, U36, U46, U47, U49, U66, U68, U71, U74 and U80 are AND gates, while U50, U52, U61 and U69 are OR gates. U45 is a NOR gate. U54, U55, U57-U59, U75 and U81 are CMOS Schmidt trigger amplifiers. U18, U51, U67 and U70 are latches, with U67 configured to divide by two. U19, U23, U37 and U62 are counters, U62 being an up/down binary counter. U63 is a four-line decoder which performs a D/A conversion based on the output from U62. U76 is a buffer amplifier, such as a TI 7406, and U77 may be a Monsanto 6200 IC chip comprising a pair of optically coupled SCRs connected as a triac. A brief description of the operation of the motor control system of FIG. 3 is set forth below.

U64 is connected to the line voltage and develops a squared-up voltage waveform. Q17 and U78 develop a square waveform which is positive when Q16 is off. U66 produces a positive pulse which is synchronized with the line voltage. The output from U66 is used to derive two system timing signals. The first is produced by U53. The second is produced by U54 and U55 and follows closely in time the output of U53. Two additional timing signals are derived from the output from U64. One is produced by U56, U57 and U81 while the other is produced by U58 and U59 and follows closely in time the output of U57. The timing for the sample-and-hold circuits Q11/U26 and Q12/U27 is provided by U13 and U22-U25. Finally, U35, U36 and U37 control the gating of the various types of responses (Type I, Type II or Type III) when the motor operation is perturbed to maximize operating efficiency.

Converting the phase angle pulse width to a voltage is performed by Q1, Q9 and U1. The output of U1 is $PA_n$ which is supplied, inter alia, to the sample-and-hold circuits. The "delay" pulse width is converted to a voltage by Q2, Q10 and U2. U3 and U4 take the output of U2 and multiply it by "m" and add "b," respectively. The output of U4 is therefore $PA_t$. U5 compares $PA_n$ with $PA_t$. The output of U5 is positive when $PA_n$ is greater than $PA_t$ and negative when $PA_t$ is greater than $PA_n$. U5 controls whether the firing delay is increased or decreased. When the output of U5 is positive, Q3 is enabled and Q13 is disabled and U6 and U8 perform the operation $(PA_n - PA_t)/2 + D_n$. When the output of U5 is negative, Q3 is disabled and Q13 is enabled and U28, U29 and U30 perform the operation $D_n - 4(PA_t - PA_n)$.

The combination of U14, U15 and U16 function as a zero error detector, i.e., they determine when $PA_n$ equals $PA_t$. When the output of both U16 and U15 are positive, the perturbation sequence is initiated. The perturbation sequencing circuitry is formed by U17, U18, U19, U50, U51, U20, U21, U32, Q4 and Q5. U18 functions as a "perturbation in progress" latch. U19 keeps track of the number of perturbations that have been initiated. U38 and U39 perform the operation $(PA_o - PA_1)/3 + PA_1$. U41 compares the output of U40 with PAn. If PAn is greater than $PA_1$ plus $(PA_o - PA_1)/3$, then the output of U41 is positive and indicates a Type II response. U43 and U42 perform the operation $PA_1 - 2$ and U44 compares this with $PA_n$. If $PA_n$ is greater than $PA_1 - 2$, then the output of U44 is positive and indicates a Type III response. The outputs of U41 and U44 are supplied to NOR gate U45 which produces a positive output indicative of a Type I response in the absence of both a Type II and a Type III response.

The gating of the various responses is controlled by U46, U47, U49 and U68. Type I and Type II responses are gated by U49 and U68 respectively. A Type III response which occurs during the first perturbation is gated by U47 while one that occurs in a subsequent perturbation is gated by U46. An output from either U46 or U47 will produce an output from U52 which will reset the "perturbation in progress" latch U18 via OR gate U69. When U49 indicates a Type I response, this causes counter U62 to decrement the offset.

The delay timing for controlling the delay in firing the triac comprises U9, U10, U11, U12, U33, Q6, Q7, Q8, Q14 and Q15. U10 and U12 are ramp generators which produce the same fixed ramp starting when the triac current goes to zero during each half cycle of the line voltage. U11 compares these ramps with the new delay in U9. The output of U11 goes positive at the end of the new delay. The output from U11 is buffered by U76 and fires triac Q16 via trigger U77. U72, U73 and U75 determine when a change in line voltage or motor loading is great enough to merit a new perturbation sequence, and initiate same.

As already noted, this and other circuitry for implementing applicants' invention will be apparent to persons skilled in the art. Applicants' invention is defined by the claims which follow.

We claim:

1. A digital method for operating a single phase induction motor control system comprising the steps of:
    (a) energizing a single phase induction motor using a firing delay;
    (b) measuring the phase angle between motor voltage and motor current zero crossings;
    (c) computing the sum of the measured phase angle and the firing delay;
    (d) using the sum to automatically calculate a new phase angle generated in accordance with the algorithm: phase angle = m (firing delay) + b, where m and b are constants, m is the slope and is negative, and b is the offset and is positive;
    (e) comparing the measured phase angle with the newly-calculated phase angle;
    (f) altering the firing delay based on said comparison; and
    (g) repeating steps (a) through (f).

2. A method according to claim 1 wherein the amount by which said firing delay is altered is proportional to the difference between the measured and newly-calculated phase angles.

3. A method according to claim 2 wherein said firing delay is increased by an amount equal to about one-half the difference between the measured and newly-calculated phase angles.

4. A method according to claim 2 wherein said firing delay is decreased by an amount equal to about four times the difference between the measured and newly-calculated phase angles.

5. A method according to claim 1 wherein:
    (f) the firing delay is increased based on said comparison; and
    (g) steps (a) through (f) are repeated until the measured phase angle and the newly-calculated phase angle are approximately equal.

6. A method according to claim 5 comprising the additional steps of:
    (a) measuring and storing an initial phase angle at time $T_o$;
    (b) increasing the firing delay by a predetermined amount;
    (c) measuring and storing the resulting phase angle at times $T_1, T_2 \ldots T_n$;
    (d) comparing said initial phase angle with the resulting phase angles; and
    (e) altering said firing delay based on said comparisons.

7. A method according to claim 6 wherein the phase angle at $T_n$ is less than the phase angle at $T_1$ and said firing delay is reduced.

8. A method according to claim 6 wherein the difference between the phase angle at $T_n$ and the phase angle at $T_1$ is less than one-third of the difference between the phase angle at $T_o$ and the phase angle at $T_1$ and said firing delay is reduced.

9. A method according to claim 6 wherein the difference between the phase angle at $T_n$ and the phase angle at $T_1$ is greater than one-third of the difference between the phase angle at $T_o$ and the phase angle at $T_1$ and the firing delay is increased.

10. A method according to any of claims 1 to 9 wherein m is between about −0.1 and about −0.2.

11. A method according to any of claims 1 to 9 wherein b is between about 65 and about 72.

12. A digital method for operating a three phase induction motor control system comprising the steps of:
    (a) energizing a three phase induction motor using a firing delay;
    (b) measuring the phase angle between motor voltage and motor current zero crossings;
    (c) computing the sum of the measured phase angle and the firing delay;
    (d) using the sum to automatically calculate a new phase angle generated in accordance with the algorithm: phase angle = m(firing delay) + b, where m and b are constants, m is the slope and is positive, and b is positive;
    (e) comparing the measured phase angle with the newly-calculated phase angle;
    (f) altering the firing delay based on said comparison; and
    (g) repeating steps (a) through (f).

13. A method according to claim 12 wherein the amount by which said firing delay is altered is proportional to the difference between the measured and newly-calculated phase angles.

14. A method according to claim 13 wherein said firing delay is increased by an amount equal to about one-half the difference between the measured and newly-calculated phase angles.

15. A method according to claim 13 wherein said firing delay is decreased by an amount equal to about four times the difference between the measured and newly-calculated phase angles.

16. A method according to claim 12 wherein:
    (f) the firing delay is increased based on said comparison; and
    (g) steps (a) through (f) are repeated until the measured phase angle and the newly-calculated phase angle are approximately equal.

17. A method according to claim 16 comprising the additional steps of:
    (a) measuring and storing an initial phase angle at time $T_o$;
    (b) increasing the firing delay by a predetermined amount;
    (c) measuring and storing the resulting phase angle at times $T_1, T_2 \ldots T_n$;
    (d) comparing said initial phase angle with the resulting phase angles; and
    (e) altering said firing delay based on said comparisons.

18. A method according to claim 17 wherein the phase angle at $T_n$ is less than the phase angle at $T_1$ and said firing delay is reduced.

19. A method according to claim 17 wherein the difference between the phase angle at $T_n$ and the phase angle at $T_1$ is less than one-third of the difference between the phase angle at $T_o$ and the phase angle at $T_1$ and said firing delay is reduced.

20. A method according to claim 17 wherein the difference between the phase angle at $T_n$ and the phase angle at $T_1$ is greater than one-third of the difference between the phase angle at $T_o$ and the phase angle at $T_1$ and the firing delay is increased.

21. A method according to any of claims 12 to 20 wherein m is between about 0.5 and about 0.7.

22. A method according to any of claims 12 to 20 wherein b is between about 10 and about 30.

* * * * *